May 17, 1960 T. E. CAROTHERS 2,936,908
TILE SETTER LOADING APPARATUS
Filed April 8, 1957 11 Sheets-Sheet 3
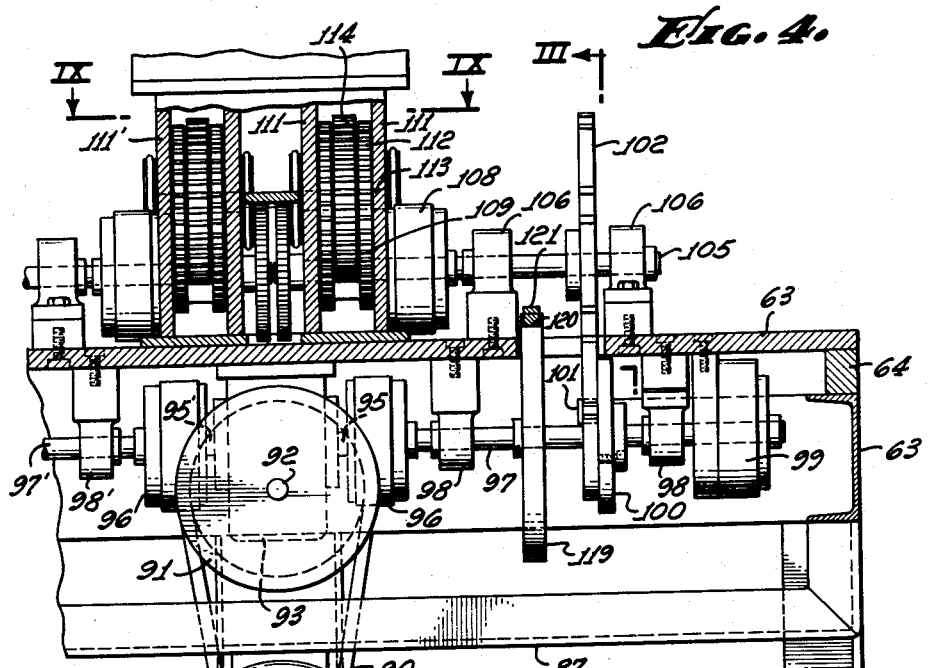
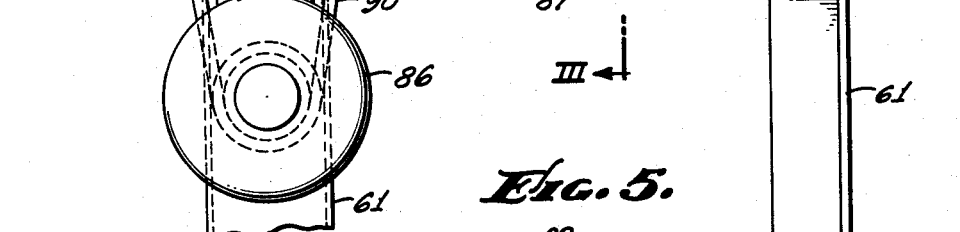
THEODORE E. CAROTHERS
INVENTOR.
BY
ATTORNEYS.

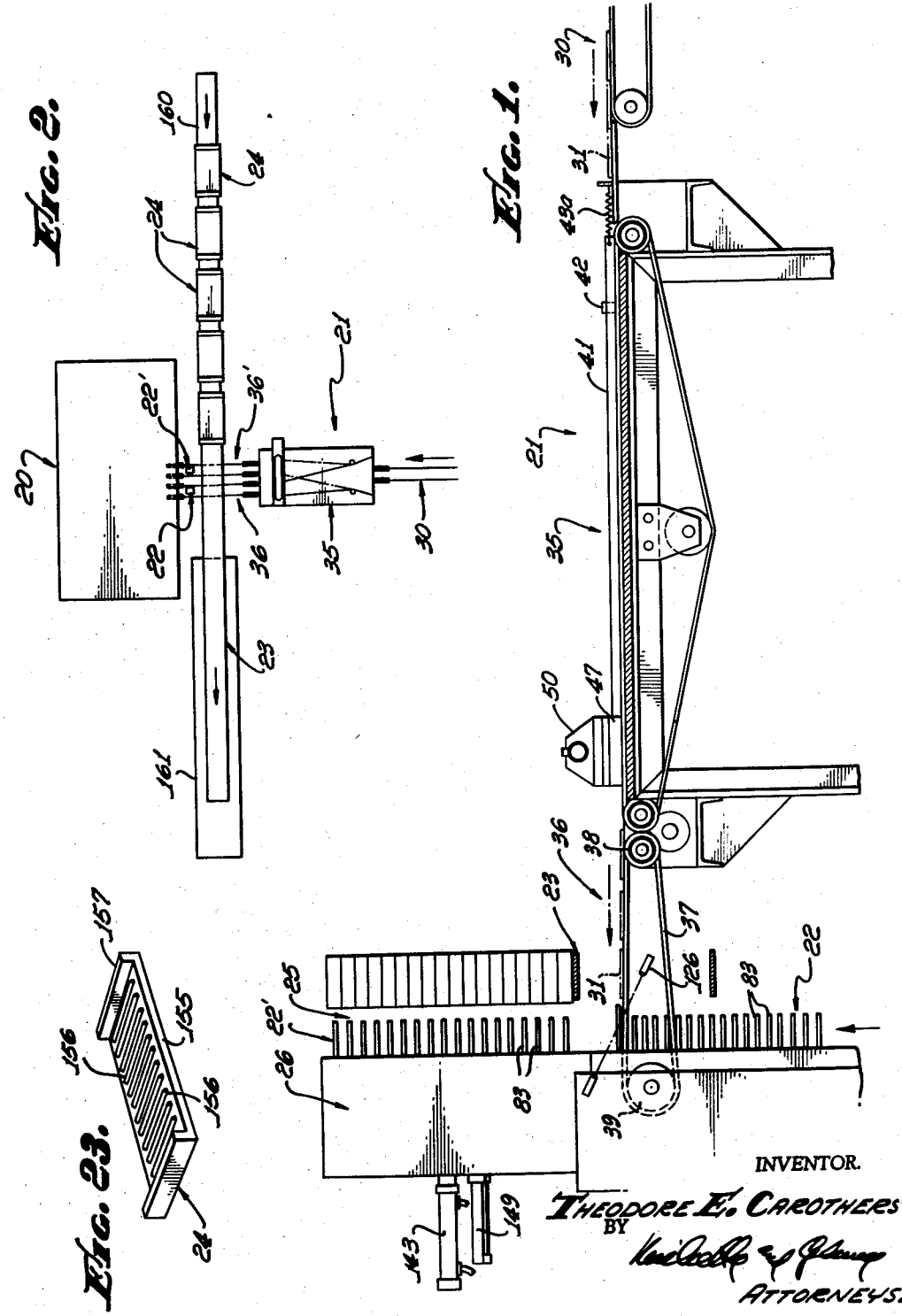

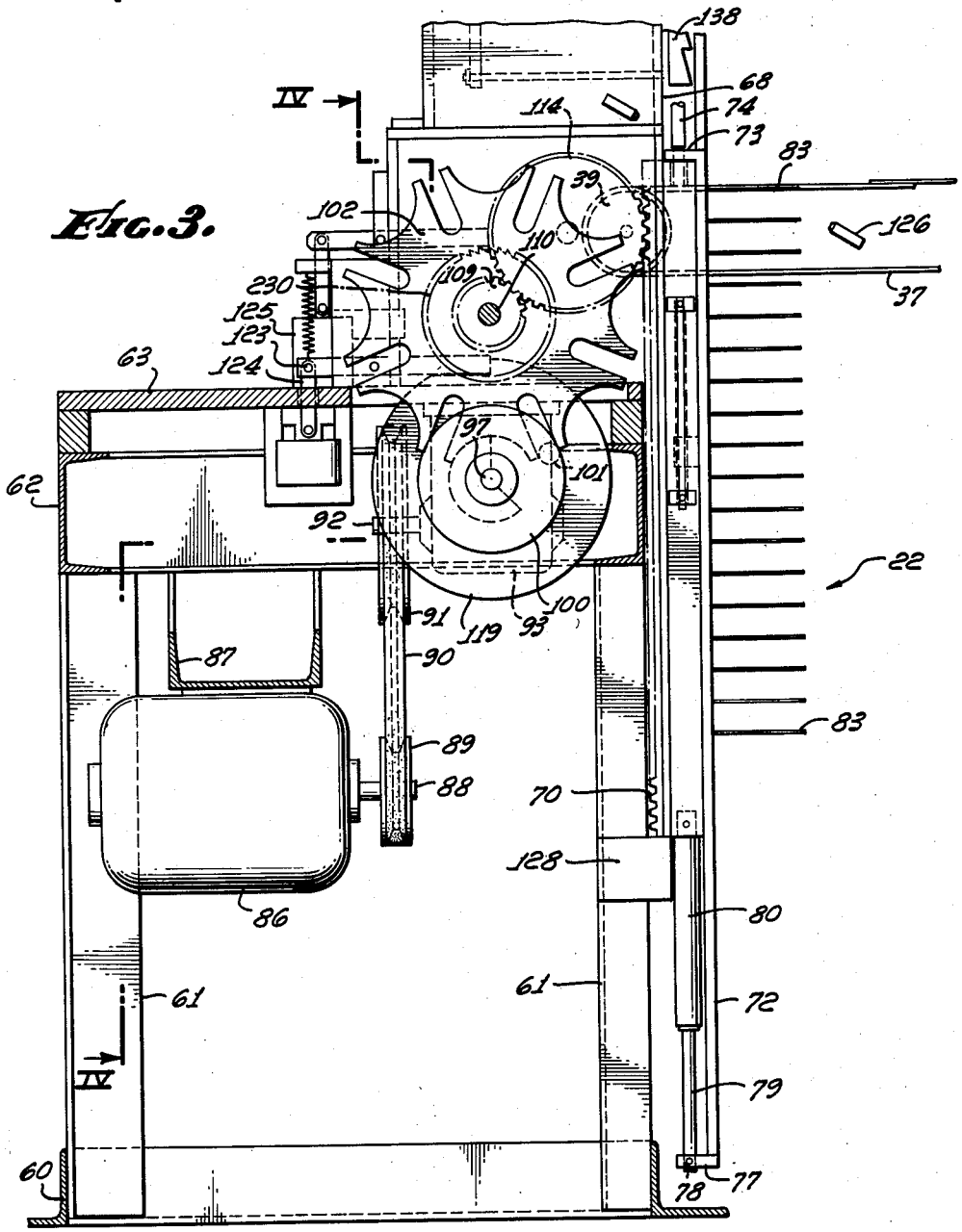

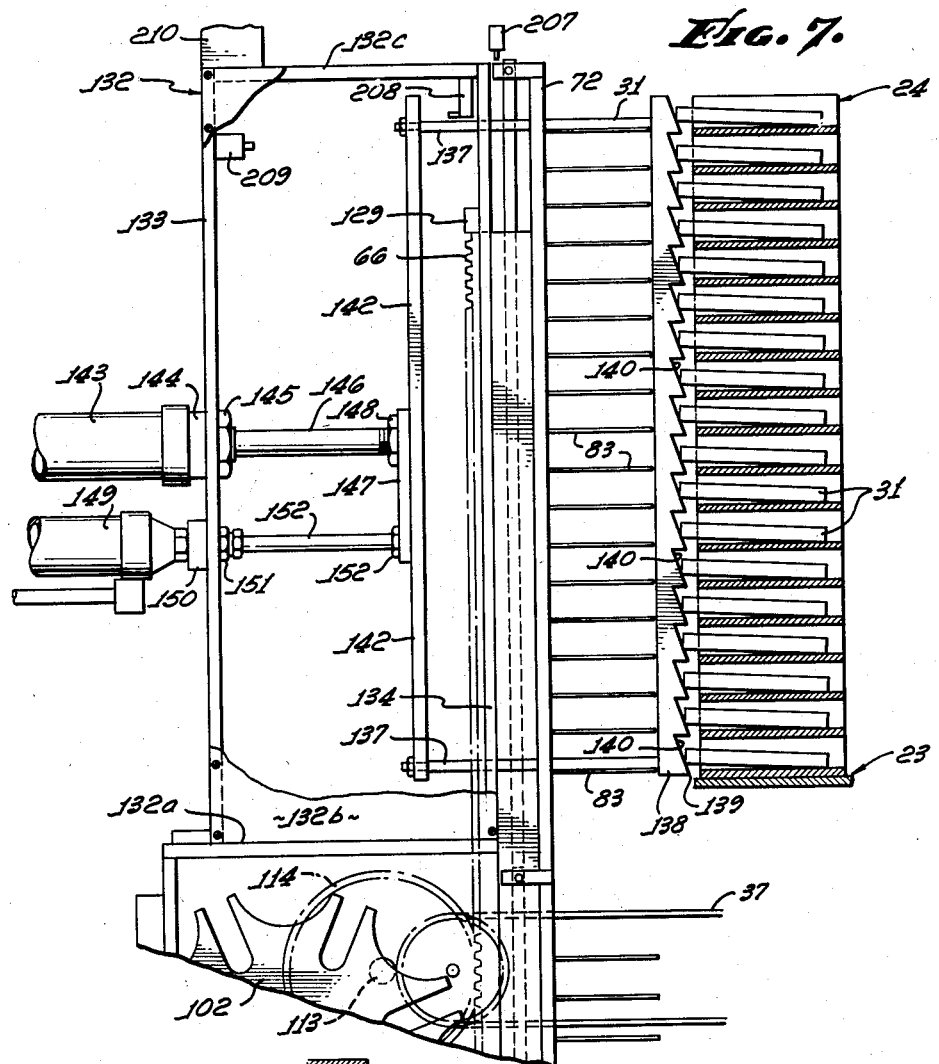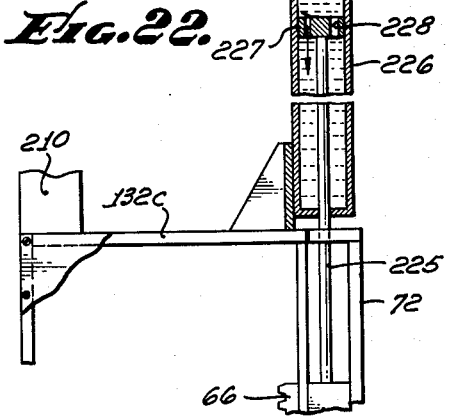

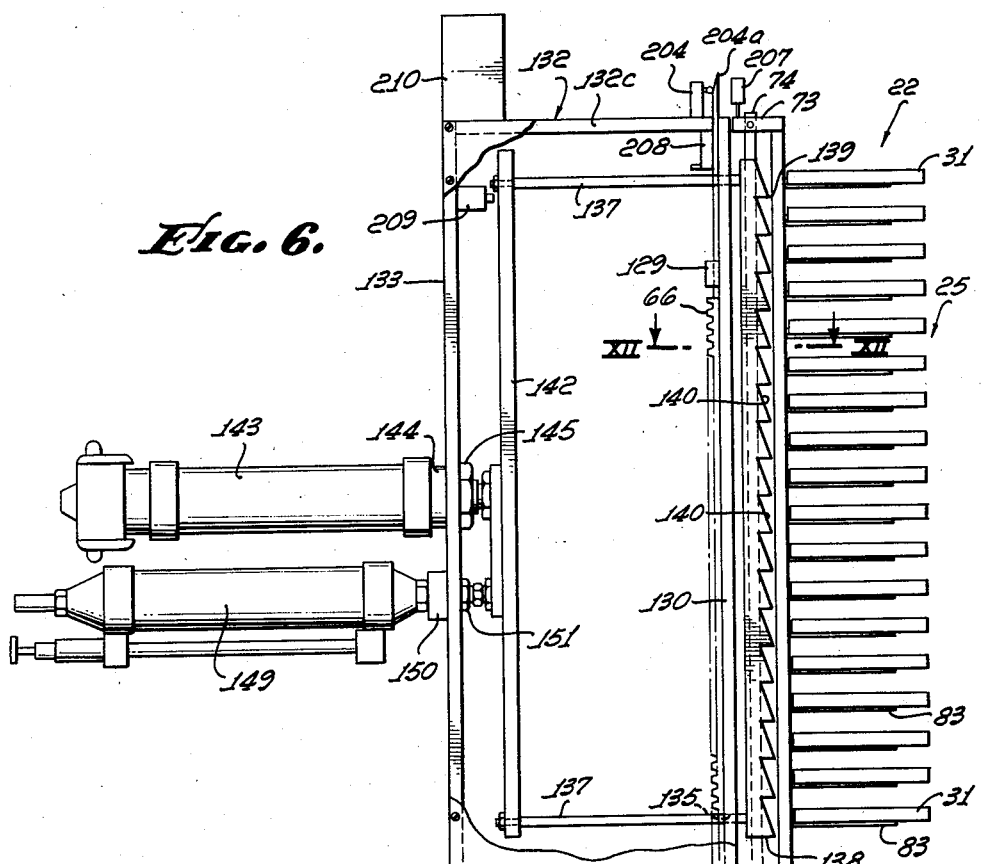
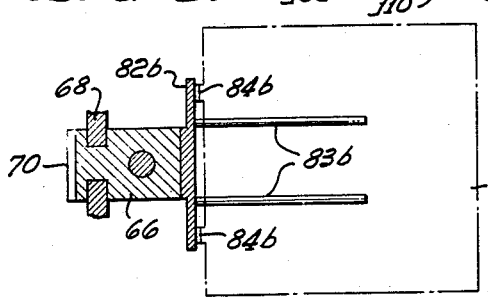

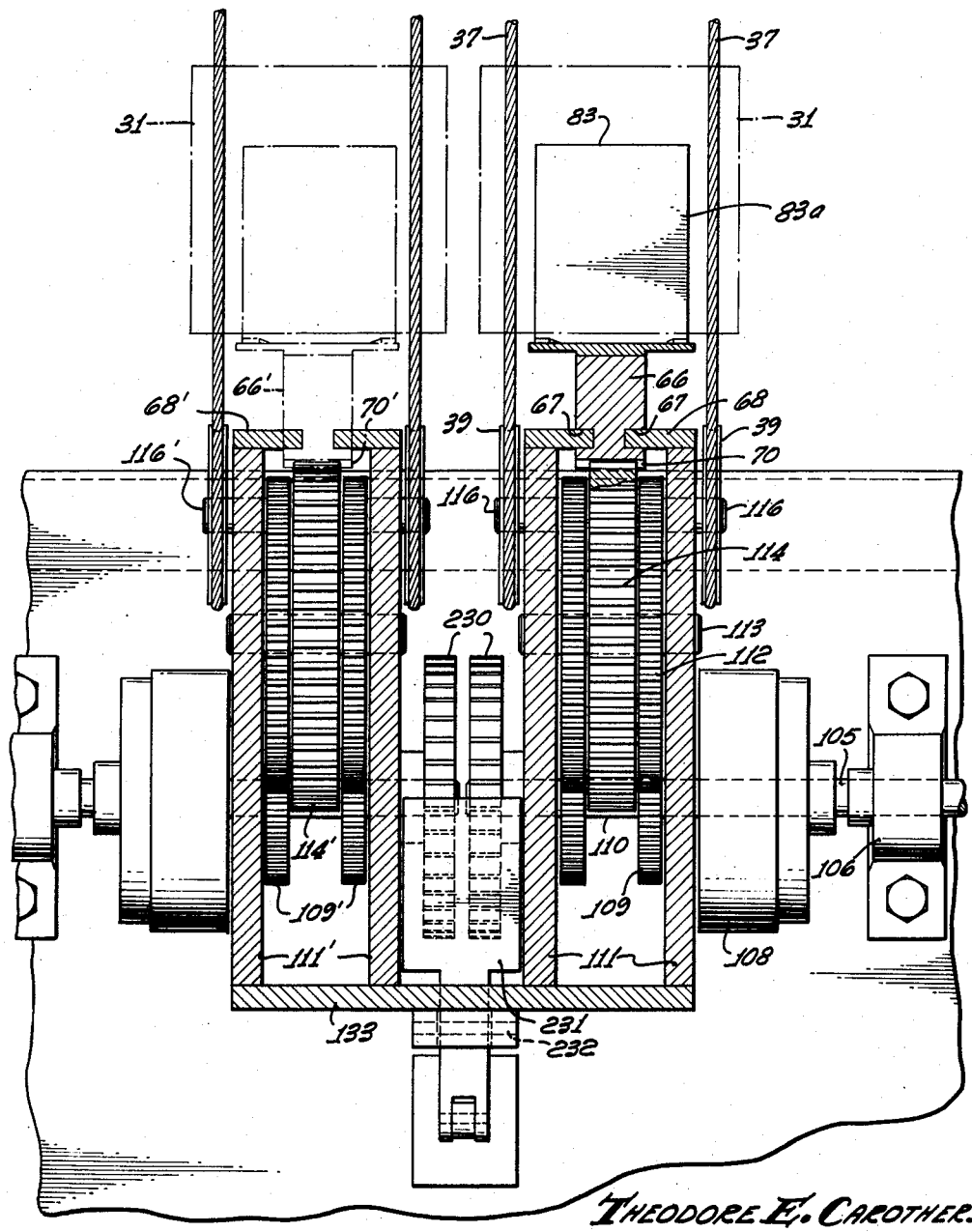

May 17, 1960 T. E. CAROTHERS 2,936,908
TILE SETTER LOADING APPARATUS
Filed April 8, 1957 11 Sheets-Sheet 7
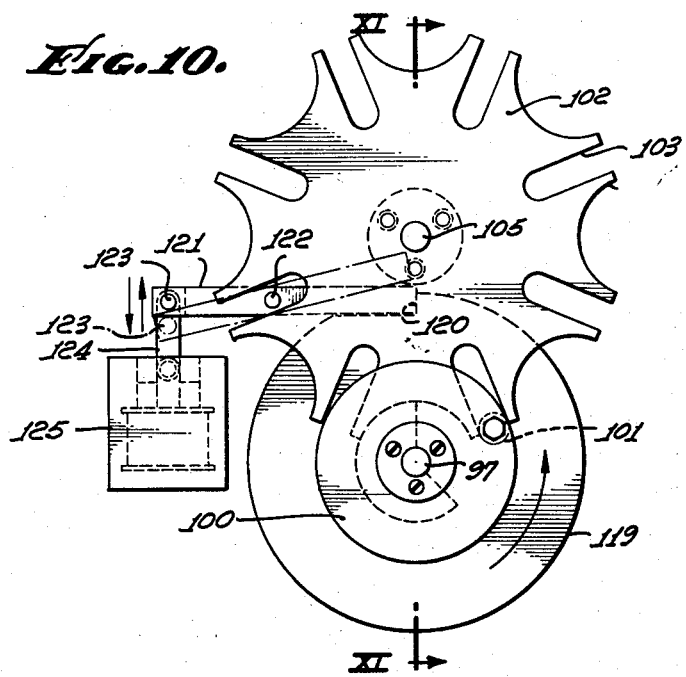
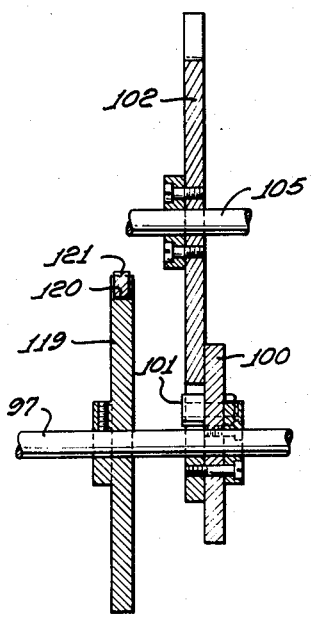
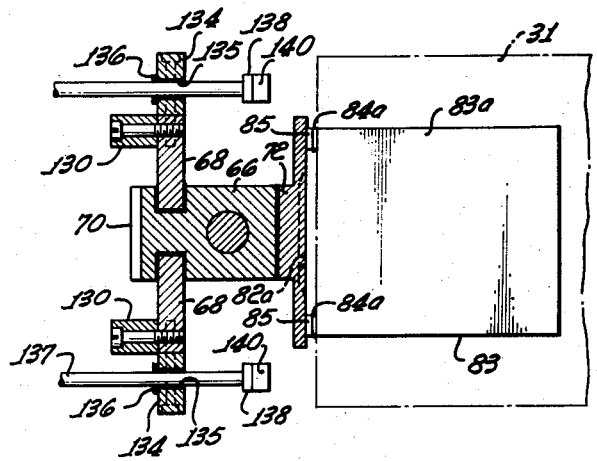
THEODORE E. CAROTHERS
INVENTOR.
BY
ATTORNEYS.

May 17, 1960 T. E. CAROTHERS 2,936,908
TILE SETTER LOADING APPARATUS
Filed April 8, 1957 11 Sheets-Sheet 8

INVENTOR.
THEODORE E. CAROTHERS
BY
ATTORNEYS.

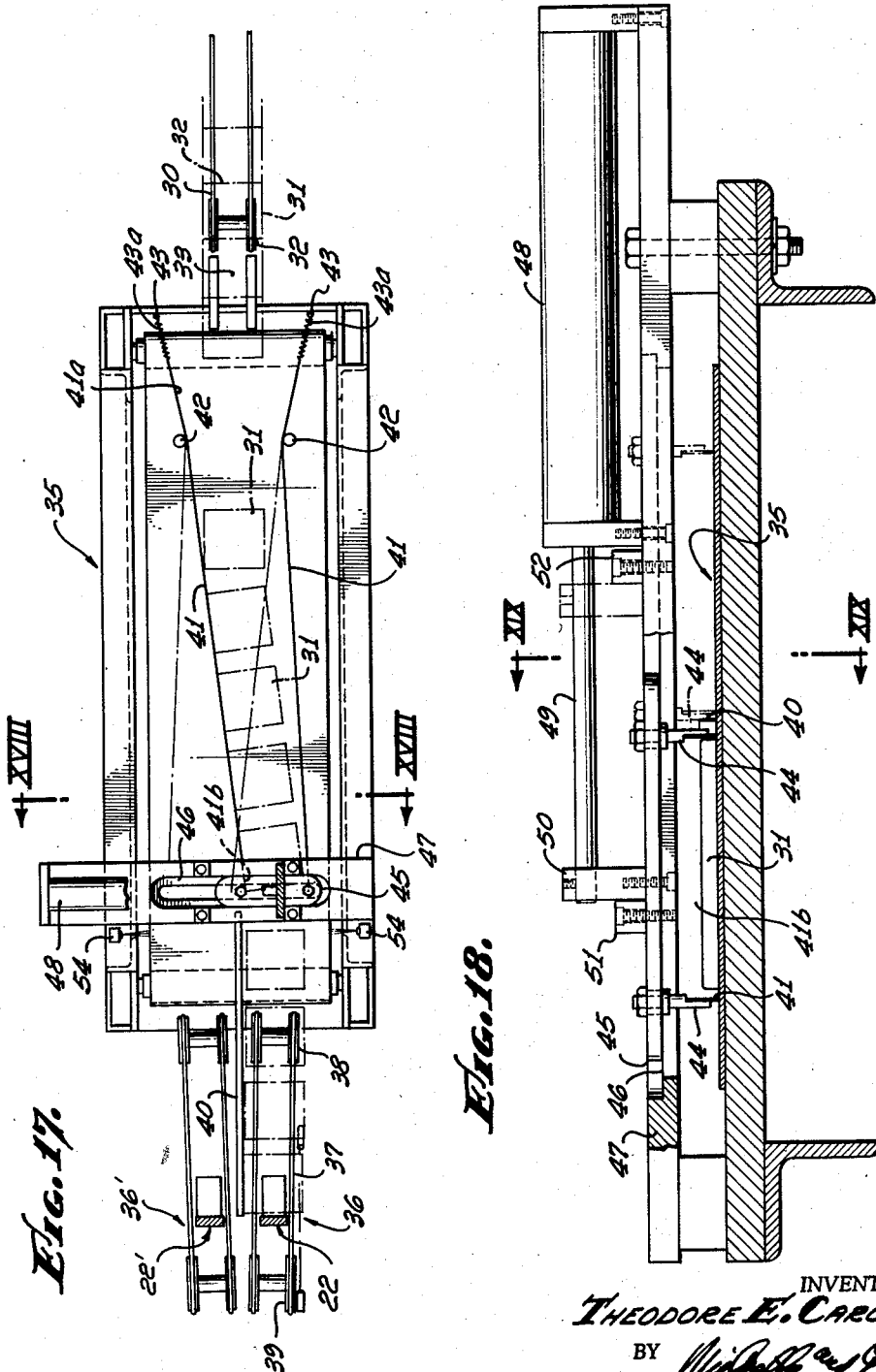

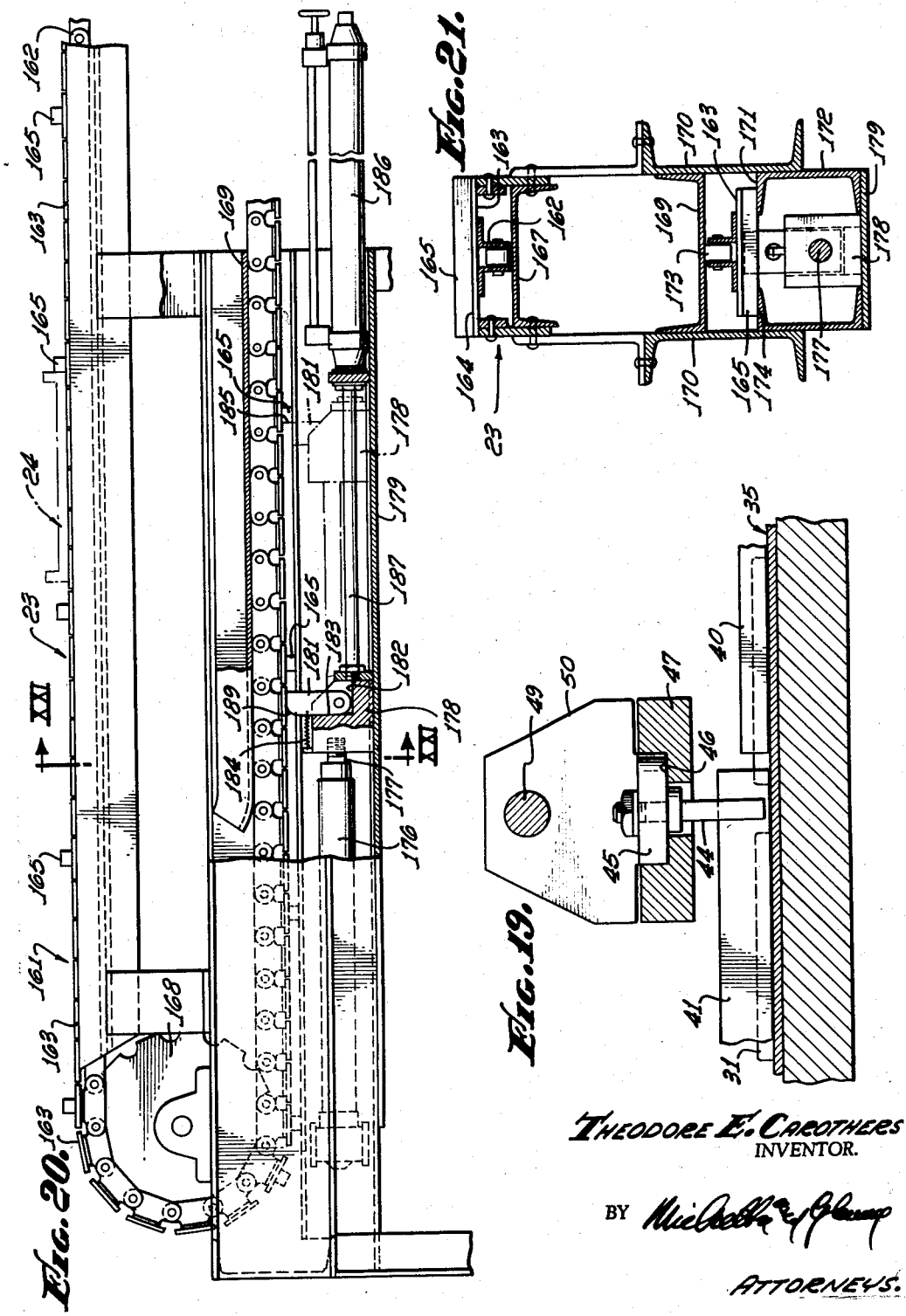

United States Patent Office 2,936,908
Patented May 17, 1960

2,936,908

TILE SETTER LOADING APPARATUS

Theodore E. Carothers, San Gabriel, Calif., assignor to Gladding, McBean & Company, Los Angeles, Calif., a corporation of California Application April 8, 1957, Serial No. 651,214

5 Claims. (Cl. 214—6)

This invention relates to an apparatus for handling flat, polygonal articles and more particularly to an apparatus for mechanically loading tile into vertically spaced relation in a tile setter during an intermediate stage of manufacture or production of ceramic composition tile.

In the manufacture of ceramic tile, tile bodies may be formed by first pressing a ceramic composition to form the tile body, and then passing such pressed and fettled tile bodies through a spray zone in which one face of the tile body is sprayed with a glaze composition for providing a decorative surface. At the end of the spray zone, sprayed tile bodies have heretofore been manually removed from a conveyor and placed in furniture or tile setters for burning. The tile setter provides means for holding a plurality of tile bodies in vertical spaced relation whereby they could be passed through a kiln out of contact with each other and each supported in a plane so as not to disturb or mar the glaze composition sprayed on one article thereof, and to prevent warping or sagging of the tile body.

The present invention particularly relates to the handling of such tile bodies between the end of a glaze spray zone and an entrance to a kiln. The present invention contemplates an apparatus and a method whereby sprayed tile bodies are continuously, rapidly received from a glaze spray zone and are automatically and mechanically loaded into tile setters at a rapid rate, for example, about 120 tile bodies per minute or one every one-half second. Such rapid handling by the exemplary apparatus of this invention includes a composite feed conveyor means arranged to receive such tile in end-to-end abutting relation to space apart said tile each from the other and to provide parallel pathways for the tile at one end. Cooperable with the composite conveyor means may be a transversely movable tile switching means to receive a single continuous line or column of tile and to alternately direct a preselected number or group of tile along each of the parallel pathways, the switching being accomplished without change in the rate of advancement of the tile. Each pathway leads to a vertically disposed rack and jig or tile carrier means provided with vertically spaced tile support elements. The carrier means receives and arranges the tile of a column in vertical spaced horizontal parallel relation in a vertical zone. When a column of tile is so supported, means are provided for elevating the vertically arranged tile simultaneously in said vertical zone to a selected predetermined position for transfer to a second parallel spaced vertical zone while maintaining such vertical spaced arrangement. In the second vertical zone may be provided tile setters which are indexed into precise position to receive and support tile being transferred from the carrier means. The apparatus contemplates alternate feeding or transfer to such tile setters so that as one carrier means is being fed with advancing tile of one column, the other carrier means is transferring and discharging vertically spaced tile into a tile setter, the latter carrier means returning to tile receiving position by the time another column of tile reaches the latter carrier means. When a tile setter is loaded, means are provided for removing the loaded tile setter from the transfer station and moving an empty tile setter into the transfer station in accurate, registered position with respect to the carrier means.

It is therefore a primary object of this invention to disclose and provide a novel apparatus for receiving a plurality of rapidly advancing articles or tile and for loading said tile into tile setters automatically and at a very rapid rate.

An object of the invention is to design and provide such an apparatus wherein tile are automatically handled without disturbance of a glaze composition sprayed thereon.

Another object of the invention is to disclose and provide an apparatus for receiving a plurality of flat relatively thin polygonal articles and loading such articles into a means for supporting the articles in vertical spaced relation in and out of contact with each other.

A specific object of the invention is to provide a switching means for rapidly dividing a single column of advancing tile into two or more columns advancing in echelon in the same direction.

Another specific object of this invention is to provide means for correlating positioning of the setters with the stacking and transferring of the tile by the carrier means.

Another main object of this invention is to disclose and provide an apparatus for receiving flat, polygonal articles arranged in column in a first plane and for arranging such articles in vertical spaced stacked relation for simultaneous horizontal movement in a plane spaced above and parallel to the first plane.

The invention contemplates many other advantages and objects which will be apparent to those skilled in the art from the following description of the drawings in which an exemplary embodiment of the invention is shown.

In the drawings:

Fig. 1 is a generally diagrammatic side elevation of an apparatus embodying this invention, one of the carrier means being shown in tile receiving position and the other of the carrier means being shown in tile unloading position, the infeed conveyor means being shown partially in section.

Fig. 2 is a top diagrammatic view of the apparatus shown in Fig. 1.

Fig. 3 is a sectional view of a portion of the apparatus shown in Fig. 1, the section being taken in a vertical plane indicated by line III—III of Fig. 4, said plane lying parallel to the axis of the infeed conveyor means.

Fig. 4 is a sectional view taken in the planes indicated by lines IV—IV of Fig. 3.

Fig. 5 is a schematic view showing the Geneva wheel and gear drive arrangement for intermittently raising the carrier means of the apparatus shown in Fig. 1.

Fig. 6 is an elevational view showing tile unloading means disposed above the tile receiving means shown in Fig. 3, only the top portion of the tile receiving means being shown.

Fig. 7 is a fragmentary side elevational view showing the tile unloading means of Fig. 6 with tile being unloaded onto tile setter means.

Fig. 8 is a fragmentary horizontal sectional view taken through a carrier means of the apparatus and showing a modification of tile support elements on said carrier means.

Fig. 9 is a fragmentary sectional view taken in the horizontal plane indicated by line IX—IX of Fig. 4.

Fig. 10 is an enlarged fragmentary schematic view of the Geneva wheel and cam means for limiting rotation of the line shaft to one revolution.

Fig. 11 is a sectional view taken in the plane indicated by line XI—XI of Fig. 10.

Fig. 12 is a horizontal fragmentary sectional view taken in the plane indicated by line XII—XII of Fig. 6.

Fig. 17 is a top view of the infeed conveyor means showing tile switching means.

Fig. 18 is a sectional view taken in the plane indicated by line XVIII—XVIII of Fig. 17.

Fig. 19 is a sectional view taken in the plane indicated by line XIX—XIX of Fig. 18.

Fig. 20 is an elevational view partly in section of the tile setter conveyor actuating means.

Fig. 21 is a vertical sectional view taken in the plane indicated by XXI of Fig. 20.

Fig. 22 is an elevational view partly in section diagrammatically indicating a modified dashpot means for controlling lowering of carrier means.

Fig. 23 is a perspective view of a tile setter member for tile setter means in which tile are loaded in vertically spaced relation.

Figure 13:
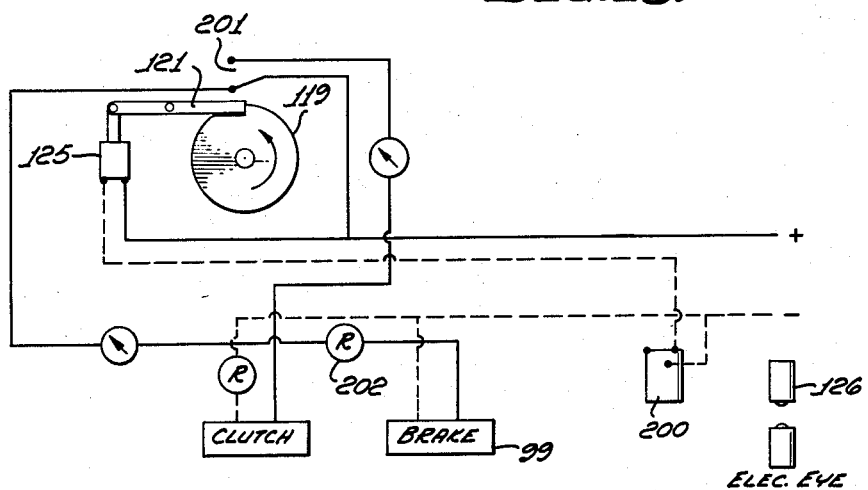
Fig. 13 is a schematic wiring diagram for controlling intermittent actuation of the carrier means of the apparatus.
Figure 14:
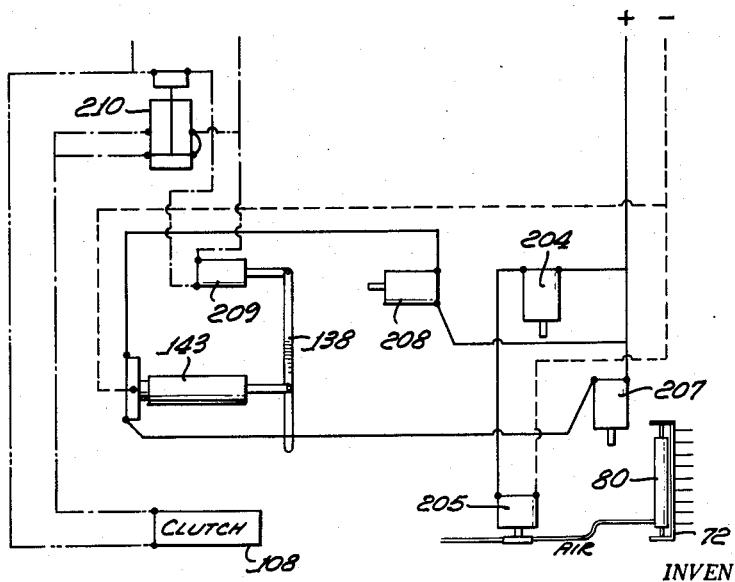
Fig. 14 is a schematic wiring diagram for controlling movement of the carrier means into unloading position and for actuation of the tile unloading means.

An exemplary apparatus generally indicated at 20 (Fig. 1) embodying this invention may comprise generally speaking, a composite infeed conveyor means 21 for advancing flat, thin, polygonal articles such as tile or tile bodies, in a substantially single, horizontal path, and then dividing or switching the tile into one or more separate parallel pathways to advance tile in alternate parallel columns, each containing a preselected number of tiles, toward a plurality of rack and jig or carrier means 22 arranged in line, each facing and being located at the end of a pathway. Each carrier means 22 is actuated intermittently to receive each tile and to accumulate and to support a selected number of tile in a vertical zone in vertical spaced apart relationship. Above the end of the infeed conveyor means 21, and in spaced relation thereto, may be provided a tile setter conveyor means 23 disposed crosswise to composite conveyor means 21. The setter conveyor means 23 may be intermittently actuated to position a tile setter means 24 carried thereby opposite the vertical zone of carrier means 22, and in a zone herein referred to as a transfer or unloading zone indicated at 25. At the transfer zone 25 tile unloading or transfer means 26 are provided for simultaneously pushing said tile from the carrier means 22 into an aligned tile setter means 24, said tile setter means 24 supporting and positioning said tile in corresponding vertical spaced relation. Control means not shown in Fig. 1, are provided for controlling the operation of apparatus 20 so that each tile emerging from a spray zone, in which a glazed composition is sprayed on the top surface of a tile, is automatically, mechanically handled from the spray zone to the tile setter means 24. The loaded tile setters may then be moved in any convenient manner to a kiln for burning. It is understood that the invention is not limited to handling of tile in this exemplary production of ceramic tile, and that the apparatus may be used in other industries and production lines.

For purposes of clarity and brevity, apparatus 20 will be particularly described with respect to structure and actuation of one carrier means 22, it being understood that adjacent carrier means 22' includes substantially the same construction. Like parts of adjacent carrier means are given like reference numerals with a prime sign. To further facilitate general understanding of apparatus 20, in Fig. 1, a pair of carrier means 22, 22' are illustrated for alternative or sequential operation, so that as one carrier means 22 receives the tile from one pathway, the other carrier means 22' may be elevated into transfer zone 25 and the tile carried thereby transferred to and unloaded onto a tile setter 24. This alternate loading and unloading of each carrier means permits uninterrupted handling of a virtually continuous rapidly advancing column of tile emerging from a spray zone in end-to-end relation at an exemplary rate of about 120 tile per minute.

*Composite feed conveyor means*

The composite feed conveyor means 21 (Fig. 17) may comprise a spray zone conveyor section 30 of any suitable endless belt or band type in which exemplary flat, thin articles, tile, or tile bodies 31 are advanced in end-to-end abutting relation as at 32, the top faces 33 of said tile having had deposited thereon a suitable glaze composition. In this example, the tile 31 may be unburned and glaze composition deposited thereon for a single fire operation. However, it will be understood that each tile may have been already once fired and the glaze composition deposited on a fired tile body.

The spray conveyor section 30 may deposit tile 31 upon an accelerator conveyor section 35 of endless belt type in central alignment with conveyor section 30 and of greater width sufficient to accommodate at its discharge end at least two parallel columns of tile. Accelerator section 35 is driven at a greater lineal rate of speed than section 30, so that as the tile are deposited on section 35, each tile will be spaced from the adjacent tile as indicated in Fig. 17. The spacing of tile in this manner affords a selected interval between adjacent tile to permit intermittent loading of carrier means 22, 22' as later described.

At the discharge end of accelerator section 35, may be provided a pair of parallel carrier feed conveyor sections 36, 36' providing spaced parallel pathways leading respectively to carrier means 22, 22'. Each feed section 36, 36' may comprise a pair of thin, narrow, endless spaced apart conveyor elements, ribbons, or circular cross-section belts 37 carried by pairs of end wheels 38 and 39, the latter pair of wheels 39 straddling the carrier means 22 which may pass vertically between the associated pair of endless belts 37. The parallel pathways may be separated and defined by a longitudinal center tile guide strip 40. Longitudinal axes of conveyor sections 36, 36' may slightly converge toward guide strip 40 so that tile carried thereby are urged against side faces of strip 40 while advancing in a path parallel thereto. Tile are thus discharged in longitudinal alignment from each pathway.

Means for driving the various sections of the composite feed conveyor means 21 are not shown, such driving means being well known and are not part of this invention.

*Tile switching means*

Means for alternately switching the advancing tile on accelerator section 35 to conveyor sections 36, 36' may comprise a pair of laterally spaced, spring-biased tile guide bands 41 (Fig. 17) providing a wide inlet opening 41a to receive tile from conveyor section 30 and converging to a narrow outlet opening 41b to just pass a tile at either conveyor section 36 or 36', and with a tile edge positioned alongside guide strip 40. A pair of laterally spaced fixed pins 42 positioned adjacent the wide opening 41a, define pivots about which the pair of bands 41 may be respectively fulcrumed when they are simultaneously switched from one conveyor section 36 to the other section 36'. The front end of each band 41 may be connected to a bracket 43 on the frame by a spring 43a to accommodate stretching during the switching operation. The back ends of bands 41 may be secured respectively to depending laterally spaced posts 44 carried by a transversely movable slide and switching member 45. The back ends of bands 41 may be spaced apart a distance slightly greater than the width of a tile and define narrow outlet opening 41b. Slide member 45 is supported above conveyor section 35 on transverse ways 46 formed in a transverse member 47 secured to the conveyor frame on opposite sides thereof.

Member 47 may support longitudinally thereof a double acting fluid operable cylinder means 48 having a piston 49 connected to an upstanding block 50 carried by the central portion of the slide member 45. Reciprocal actuation of the piston will selectively position the narrow outlet opening 41b of bands 41 in alignment with a selected conveyor section 36, 36'. Stop elements 51, 52 on member 47 contact block 50 to precisely limit lateral movement of the slide member 45 and positively align a tile with a section 36 with one edge of the tile in close proximity to a side guide face on the guide strip 40.

Switching of the tile onto conveyor section 36, 36' may be made in accordance with the number of tile to be loaded on the carrier means 22, 22'. A photoelectric counting means 54 of well known manufacture (comprising a light beam source and an eye receiving the beam) may be positioned rearwardly adjacent the transverse member 47 to count tile passed onto a conveyor section 36, 36', the tile interrupting the light beam. As the last tile to be loaded on a carrier means is counted, the cylinder means 48 is actuated through counting means 54 and the slide 45 is laterally moved to position the bands 41 to feed the next tile onto the other conveyor section 36, 36'. The counting means 54 is automatically reset to count tile advancing on conveyor section 36'. The switching is accomplished in the time interval provided by the spacing of the tile so that continuous flow of tile and continuous feed of the carrier means 22, 22' is provided.

*Tile carrier (rack and jig) means*

Carrier means 22 (Fig. 3) may be supported for intermittent vertical movement in a vertical zone at the end of conveyor section 36 from a rigid frame structure including base frame members 60 of angle section having welded thereto upstanding legs 61 of suitable metal section. The top of legs 61 may be connected by a rigid, hollow, horizontally disposed frame 62 formed of channel section. Above channel frame 62 may be provided a top horizontal plate 63 supported therefrom by spacer members 64. Other frame members (not shown) may be provided to suitably brace and rigidify the frame structure.

Carrier means 22 (Figs. 3, 9) may comprise an elongated rigid bar 66 of rectangular cross-section provided with parallel aligned, longitudinally extending side guide grooves 67 to slidably receive a pair of vertically extending, spaced and opposed guide members 68 secured to frame 62 and upstanding frame extensions 69. Each pair of guide members 68 extend upwardly into transfer zone 25 to accurately position carrier means 22.

The back face of rack bar 66 may be provided with rack teeth 70 extending the entire length thereof. The front face 71 of rack bar 66 slidably supports an elongated jig or tile carrier member 72. At the top of jig member 72 may be provided an inwardly extending top ported lug 73 overlying the top face of bar 66, and slidably receiving a top upwardly extending guide rod 74 carried by the rack bar. The bottom end of jig member 72 may also include an inwardly directed bottom lug 77 having a fixed connection at 78 to one end of a piston rod 79. Piston rod 79 may carry a piston head (not shown) cooperable with an air operated cylinder 80 carried by the bottom end of rack bar 66, the axes of said cylinder 80, piston rod 79, and guide rods 74 being aligned. Compressed air from a suitable source introduced into cylinder 80 may retract piston rod 79 from its downwardly directed extended position as shown in Fig. 3, so as to cause upward movement of jig member 72 relative to the rack bar 66 for a preselected distance to position the jig member in transfer zone 25.

The jig member 72 may be provided with a plurality of vertically spaced article or tile support elements 83 facing conveyor section 36 and passable through the pair of conveyor belts 37. In this example, the article support elements may comprise thin, rigid, rectangular, forwardly extending trays 83a, each secured in a transverse slot 82a provided in the front face of the jig member 72. Each tray 83a may be provided with upstanding stop tabs 84a at inner or back corners thereof, said stop tabs 84a being faced with a pad 85 of any suitable resilient cushioning means such as rubber, felt and the like, to soften the impact of a tile moved onto said tray from the infeed conveyor section 36. Stop tabs 84a may be spaced apart the same distance as tile spacer lugs normally provided on the advancing edge face of each tile so that only the lugs contact tabs 84a and no engagement is made with the top advancing edge of a tile. Such latter engagement with the top edge of a tile may disturb sprayed glazed composition previously deposited thereon.

In Fig. 8 a pair of forwardly extending spaced tile support elements or pins 83b are provided instead of a tray 83a. The pins 83b may be secured in sideward extension flanges 82b provided on a rack bar. The extension flanges may provide forwardly extending faces 84b to engage only the spacer lugs on a tile.

*Carrier actuating means*

Means are provided to intermittently actuate and elevate carrier means 22 in response to advancing tile to position each supporting element 83 slightly below the plane of the top lay of conveyor 36 so that a tile advanced thereby will be moved over support elements 83 and stop against tabs 84a on jig member 72. Such actuating means may include a suitable direct current electric motor 86 (Figs. 3, 4) mounted on a motor shaft 88 which carries a pulley 89. A drive belt 90 connects pulley 89 with a pulley 91 of larger diameter mounted on an input shaft 92 of a reduction gear means generally indicated at 93. The gear means 93 may be of well known manufacture and includes a gear train providing engagement with oppositely directed double output shafts 95 and 95'. Output shafts 95, 95' are respectively cooperably connected to the carrier means 22, 22' and may be cooperably associated with clutches 96, 96' to provide by alternate actuation of said clutch means, alternate driving of line shafts 97, 97'.

Line shaft 97 may be supported by axially spaced, pillow block bearing means 98 secured to and beneath top plate 63 in any convenient manner. At the end of line shaft 97 remote from clutch means 96 may be provided suitable electrically actuated brake means 99 of well known manufacture supported from top plate 63 in suitable manner. Between bearings 98 may be mounted a rotatable Geneva wheel actuating disc 100 secured to line shaft 97 for rotation therewith. Disc 100 carries on its face directed toward clutch means 96 a drive roller 101 for cooperable engagement with radially, outwardly directed slots 103 having outer open ends provided on a Geneva wheel 102.

Means to positively limit rotation of the line shaft 97 carrying the Geneva wheel to one revolution may comprise a cam wheel 119 carried by line shaft 97 inwardly of wheel 102. The cam wheel 119 may be generally circular and provided with a recess or notch 120 in the circumferential edge thereof to receive a cam follower arm 121. The cam follower arm 121 may be pivotally mounted intermediate its ends at 122 on a frame member. The end of the arm remote from the cam wheel 119 may be pivotally connected at 123 to a vertically disposed armature element 124 of a solenoid 125. Movement of armature element 124 is caused by interruption of a light beam by a tile just being loaded on carrier means 22, the light beam being provided by a photoelectric eye means 126 mounted adjacent carrier means 22. Energization of the solenoid will pivot follower arm 121 about pivot 122 so as to lift the end of the arm out of engagement with recess 120 and permit rotation of cam wheel 119 through one revolution.

The Geneva wheel 102 may be carried and fixed to a countershaft 105 supported above the top plate 63 by suitably spaced bearing means 106. As viewed in Figs. 3 and 10, counterclockwise rotation of line shaft 97 will engage roller 101 with a slot 103 to turn the Geneva wheel 102 a selected increment to rotate countershaft 105 in a clockwise direction. Countershaft 105 is thus incrementally rotated.

The countershaft 105 is cooperably connected to an electrically actuated normally engaged clutch means 108 adjacent the inner bearing means 106. The clutch means 108 provides a releasable driving connection to a dual toothed spur gear 109 carried by the countershaft portion 110, such shaft portion 110 being supported in spaced upstanding frame members 111. Spur gear 109 is provided in meshed engagement with a driven dual toothed gear 112 supported on an axle 113. Each axle 113 also carries between the dual teeth of gear 112 a pinion gear 114 which has a diameter greater than the diameter of gear 112 and which is aligned with rack bar 66 in driving meshed engagement with rack teeth 70.

Thus as line shaft 97 is rotated in counterclockwise direction, the Geneva wheel 102 is turned in a clockwise direction (Fig. 10), the countershaft 105 and spur gear 109 will also turn in clockwise direction. Turning of the spur gear 109 in clockwise direction will cause gear 112 and pinion gear 114 to turn in counterclockwise direction so that the meshed engagement of teeth of pinion gear 114 with teeth 70 of the rack bar will cause the rack bar to be raised a selected, vertical increment so as to properly position an article support element 83 on jig member 72 just below the plane of the advancing tile.

Lowermost starting position of rack bar 66 is provided by and defined by an adjustable bottom stop 128 carried on a leg 61 and spaced below top plate 63. In such lowest position, the topmost support element 83 is disposed just below the plane of advancing tile 31 (Fig. 3). In uppermost position, rack bar 66 is positioned by a top stop means 129 (Fig. 6) carried by frame extension 130, said top stop 129 being spaced above the plane of advancing tile 31 so that the bottom-most support element 83 is positioned to receive a tile. In this uppermost position, an upstanding switch-contacting element 204a carried by rack bar 66 contacts a limit switch 204 carried above the rack bar to actuate the cylinder and piston means 80, 79. Energization of cylinder 80 causes the jig member 72 to move relative to the rack bar 66 to an uppermost position as indicated in Figs. 6 and 7, to position tile 31 carried thereby in horizontal alignment with tile setter 24. In such uppermost position, the tile 31 on support elements 83 are in transfer zone 25, and are in aligned position for unloading onto tile setter means 24.

*Transfer or unloading means*

Means to transfer and unload a plurality of tile 31 accumulated in vertical spaced relation on support elements 83 and positioned in the transfer zone (Figs. 6, 7, 12) may include a housing 132 supported above the carrier drive means and comprising a back wall 133 secured to a bottom wall 132a covering the drive means, upwardly extending frame extension 130 to which may be secured sidewardly extending vertical guide members 134, side walls 132b and a top wall 132c. Guide members 134 may be provided with top and bottom vertically spaced pairs of ports 135 provided with friction bushings 136 to receive therethrough top and bottom pairs of push rods 137. Vertically aligned rods 137 of each pair may be interconnected by a vertically disposed tile pusher member 138 having a saw-toothed front edge 139 providing a plurality of downwardly inclined faces 140. Each inclined face 140 is adapted to contact the bottom edge of a tile so as to leave undisturbed glazed composition at the top edge of the tile. The inclined faces 140 may simultaneously contact the plurality of tiles carried by the carrier means 22. Each pair of push rods 137 may be carried by a vertically disposed movable plate 142 in suitable bushings 136 so that push rods 137 may be simultaneously and uniformly advanced through bushings 136.

Means for supporting and moving plate 142 and pusher member 138 may include an air operable cylinder means 143 carried by back wall 133 of frame housing 132. Cylinder means 143 includes an end mounting 144 having a securing nut 145, said end mounting including a reduced portion extending through an opening in wall 133 and tightened thereagainst by nut 145. The cylinder means 143 may include a piston rod 146 which may be connected at its outer end in any suitable manner as by a plate 147 and a nut 148 to movable plate 142. The cylinder means 149 may provide a hydraulically operable check means for actuating cylinder 143 and may be similarly mounted on wall 133 below cylinder 143, said cylinder means 149 including an end mounting 150 secured against wall 133 by suitable nuts 151. Cylinder means 149 includes a piston rod 152 secured in suitable manner as at 152 to plate 147 carried by plate 142.

When cylinder means 143 is actuated and the tile pusher members 138 are urged forwardly in parallel vertical relation, inclined faces 140 will contact the bottom back edges of tile carried by the article support elements and push said tile in the transfer zone onto aligned tile setter means 24. It should be noted that the article support elements 83 are positioned slightly above the surface receiving portion of the tile setters so that as said tile are moved into the tile setters, the front bottom edge of the tile slides along the surface of the tile setter.

Tile setter means 24 receiving the tile being unloaded may comprise a ceramic tile setter having a flat base 155 provided with transverse ribs 156 on the top face thereof, each setter being adapted to carry two tiles in side by side relation. Upstanding end flanges 157 support a superimposed tile setter in aligned stacked relation and adjacent stacked setters define transverse through openings into which the unloaded tile may be received. Tile setter means 24 may include any selected number of tile setters vertically stacked to provide groups of, for example, 12 to 18. It is understood that tile setters of different construction or furniture may be used if desired.

*Tile setter conveyor*

The tile setter conveyor 23 extends transversely of composite conveyor 21 (Figs. 2, 20) and includes an empty tile setter loading end 160, a central portion for receiving tile from carrier means 22, 22' and a loaded tile setter unloading end 161. Setter conveyor 23 may include an endless roller chain 162 carrying flat chain plates 163 to provide a relatively flat top chain face 164 upon which tile setters may be placed in stacked relation. At uniformly spaced intervals face 164 is provided with transverse setter positioning lugs 165 spaced apart a distance greater than the length of tile setter means 24. Setter means 24 are positioned in abutment against the leading face of lug 165.

The top lay of chain 162 may be supported on a guide frame member 167 so that the tile setter means 24 are advanced along a predetermined plane without sagging of the top lay. Chain 162 may be supported from end sprockets 168 in usual manner. The bottom lay of chain 162 may be guided between a transverse channel member 169 carried between frame members 170 and top faces 171 of a pair of vertically disposed channels 172, each secured to a frame member 170. Rollers 173 of the chain rollingly engage the bottom surface of member 169 and outwardly directed faces 174 of lugs 165 slidably engage faces 171. The bottom lay of the chain 162 is thus supported against vertical sagging or displacement in an upward direction so that a pushing force may be applied to one end of the bottom lay of the chain.

Means to intermittently move conveyor chain 162 a preselected distance to accurately and precisely register a tile setter means 24 in the transfer or unloading zone 25 and opposite carrier means 22, 22' may include a fluid operable cylinder and piston means 176 carried by the frame structure below the setter unloading end 161 of the setter conveyor and in alignment with and below the bottom lay of the setter conveyor. A piston 177 carries at its outer end a shoe 178 slidable along a longitudinal brass plate 179 secured across members 172. The shoe 178 carries a pivotally mounted normally upstanding dog 181 in a recess 182 having a vertical wall 183 against which the dog is normally held by a spring 184. Dog 181 is engageable as at 185 with the back face of a lug 165. Extension of piston 177 will thus push chain 162 a selected distance so that a tile setter 24 is in proper register with carrier means 22, 22'.

In this example, means to limit the stroke of piston 177 to selected distance may comprise a cylinder and piston means 186 disposed in longitudinal alignment with cylinder means 176 beneath the bottom lay of the conveyor chain and having a piston 187 connected to the shoe 178 at its face opposite to the connection of piston 177 thereto. The cylinder and piston means 186 serves to hydraulically check the outward action of piston 177 and cushions movement of the shoe 178 into its final ultimate extended position. Final position of shoe 178 may be determined by adjustment of the connection of the shoe 178 to piston 187 or by other suitable means.

On the return stroke of the piston 177, dog 181 contacts the lug 165 next rearwardly adjacent upon a curved back face 189 on the top of the dog and pivots downwardly to pass under lug 165. The piston 177 is retracted sufficiently rearwardly of lug 165 to permit dog 181 to snap into upright position ready for pushing engagement with the next lug 165 to register the chain 162 in its next tile setter position.

Figure 16:
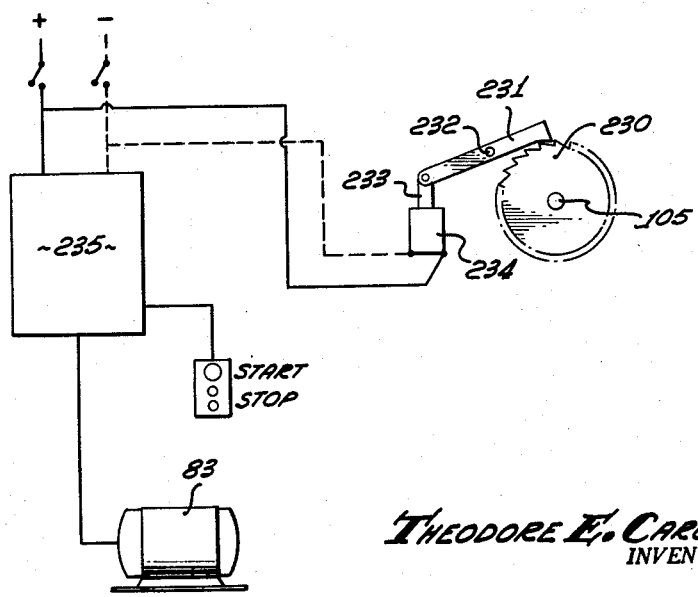
Fig. 16 is a schematic wiring diagram illustrating a safety device for holding the carrier means in the event of power failure.

Operation of apparatus 20 will be described in relation to electrical control means shown in Figs. 13 and 16 inclusive. In initial operation a setter 24 is positioned at the transfer zone, carrier means 22 is in lowermost position, the D.C. motor is energized and its driving output shafts 95, 95' and clutch means 96, 96' are disengaged. Tile 31 are advanced in end-to-end relation on conveyor section 30 to accelerator section 35 which spaces apart said tile a selected distance as described above. Spaced tile enter wide opening 41a and are directed by bands 41 to feed conveyor section 36 which advances tile in longitudinal alignment along guide strip 40 to carrier means 22. As a tile begins to move over the top of the uppermost article support element 83, the beam of the photo electric eye means 126 is broken which causes actuation of a relay 200, Fig. 13. Clutch 96 is energized and actuated into engaged position, brake means 99 is de-energized to release shaft 97 and solenoid 125 is energized to pivot cam follower arm 121 out of engagement with cam 119 and to close microswitch 201 to thus cause rotation of drive shaft 97. The roller 101 on wheel 100 rotates into engagement with a slot 103 on Geneva wheel 102 to incrementally rotate shaft 105 and also drive gears 109, 112 and 114 to raise rack bar 66 a selected distance to position the next article support element 83 in position to receive the next tile.

Microswitch 201 is held closed by follower arm 121 until arm 121 is moved about its pivot by following the cam edge of the cam 119 to open microswitch 201 and to thus de-energize and disengage clutch 96 and energize brake 99. The circuit to brake 99 may be through a rheostat 202 to cushion the effect of brake 99 and to allow follower arm 121 to enter notch 120 without shock and positively limit rotation of shaft 97 to one revolution.

This cycle is repeated as each tile passes photo-electric means 126 until the last tile is deposited on a support element 83. At this point it may be noted that the last tile is determined by the photo-electric accounting means 54 disposed adjacent the switching means 45, 47. When a selected number of tile have been advanced onto section 36 the counting means energizes the cylinder and piston 48, 49 to cause slide member 45 to move rapidly transversely and position narrow opening 41b in alignment with conveyor section 36'. This is accomplished within the time period provided by the spacing of the tile. The next group of tile is thus directed toward the carrier means 22' which is caused by intermittent operation to elevate tile received thereby in the same manner as that described above for carrier means 22.

Loaded carrier means 22 has been elevated with rack bar 66 in uppermost position. The upwardly directed extension actuates a microswitch 204 which energizes a circuit to a normally closed solenoid air valve 205 to open said valve to introduce air into cylinder 80 to raise jig member 72 upwardly relaitve to the rack bar and into proper elevated position in transfer zone 25 with tile carried thereby slightly above and in alignment with one side of vertically spaced openings provided in tile setter means 24. When the jig member 72 reaches its top position it contacts a one way impulse switch 207 which causes energization of cylinder means 143 to advance the tile pusher members 138 which engage the back bottom edge of each tile carried by the article support elements so as to push said tile onto the tile setter means 24. As the tile pusher members reach the end of their forward advancement the plate 142 contacts a microswitch 208 which causes the piston of cylinder 143 to retract.

Plate 142 when retracted to normal inoperative position contacts a one way impulse microswitch 209 which actuates a timer means 210 which de-energizes clutch 108 to permit the rack 66 and jig member 72 to move downwardly due to the weight thereof until the rack 66 contacts the bottom stop 128. The normally closed contacts of timer 210 may be directly connected to clutch 108 and the normally open contacts of the timer may also be connected to clutch 108 through a rheostat which may set the holding of the clutch slightly below the amount needed to support the weight of carrier means 22. The rack 66 may thus slip clutch 108 on its downward travel for cushioning the contact of rack 66 with stop 128. The timer means is set to allow sufficient time to elapse for the rack 66 to be seated on stop 128 before energizing clutch 108 into clutch engaged position so that when the first tile of the next group of tile is directed to carrier means 22, actuation of the carrier drive means as described above will be operative to elevate the rack bar 66.

Means for controlling the intermittent movement of the tile setter conveyor 23 are associated with both carrier means 22, 22', and when carrier means 22, 22' have been unloaded, the setter control means are operable to move the loaded setter means 24 out of the transfer zone and to position an empty setter means 24 in said transfer zone. This occurs during the time interval between unloading of carrier means 22' and before carrier means 22 is loaded and in position in the transfer zone for unloading.

Figure 15:
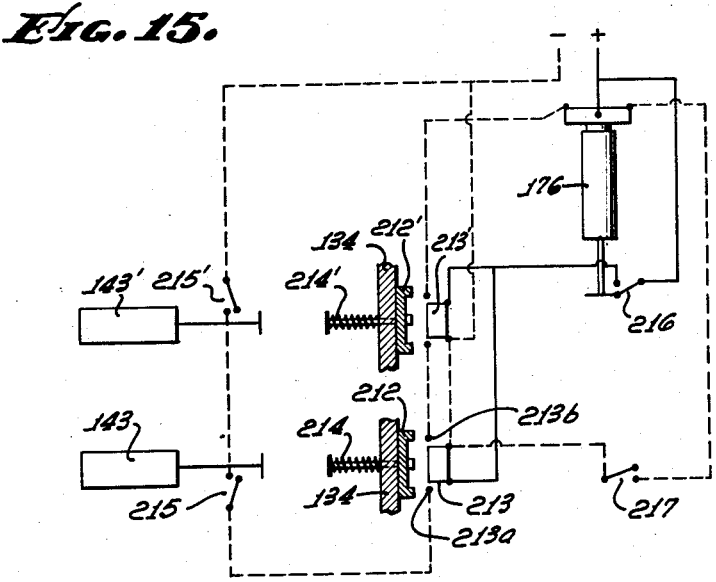
Fig. 15 is a schematic wiring diagram showing control means for intermittently actuating the tile setter conveyor when a tile setter means has been loaded.

Such exemplary control means is shown in Fig. 15 wherein cylinder and piston means 176 and tile pusher cylinders 143 and 143' are diagrammatically shown. Frame member 134 may carry switch bridging contacts 212 and 212' facing the unloading zone and respective magnets 213 and 213' supported opposite contacts 212, 212'. Contacts 212, 212' are normally biased out of the magnetic field of magnets 213 and 213' by springs 214, 214'. Associated with cylinders 143 and 143' are normally open microswitches 125 and 215' and associated with cylinder 176 and piston 177 is normally open microswitch 216. Microswitch 217 to cause retraction of piston 177 is normally open.

Initially cylinders 143, 143' and 176 and associated pistons may be in retracted position, switches 215, 215', 216 are closed by the retracted pistons, magnets 213 and 213' are energized. Switch contacts 212, 212' and 217 are open. When carrier means 22 is positioned in the transfer zone for unloading and cylinder means 143 is actuated by microswitch 207, the piston of cylinder 143 moves forwardly opening limit switch 215 and forcing the contact 212 against energized magnet 213 where it is held by the magnet in closed position and bridges contacts 213a and 213b. The piston of cylinder means 143 then moves backward and when retracted closes switch means 215. Carrier means 22 is then lowered for commencement of its reload cycle. When carrier means 22' is positioned for unloading, cylinder means 143' is actuated by the microswitch means 207' to cause the piston of cylinder means 143' to move forwardly to urge contact member 212' against magnet 213', to bridge and make contacts 213a' and 213b' and to open switch means 215'. The energized magnet 213' holds the contact element 212' and when the piston retracts, the switch means 215' is closed thereby. Closing of both contact elements 212, 212' thus completes a circuit across contacts 213a, 213b, 213c, 213d to the setter cylinder means 176 energizing said cylinder by causing air to be admitted thereto and causing piston 177 to move forwardly opening switch means 216 and pushing the tile setter conveyor chain 162 for its preselected distance to move the loaded tile setter means 24 out of transfer zone. Opening of switch means 216 breaks the current on magnets 213 and 213' to de-energize the magnets which causes contacts 212 and 213' to open and to be moved back out of the magnet field against member 134 by biasing springs 214, 214'. Opening of contacts 212, 212' also breaks the circuit to the cylinder means 176, which does not stop forward motion of the piston 177 of cylinder means 176 since the air cylinder control needs only momentary contact to operate. As piston 177 reaches its maximum forward stroke, switch means 127 is momentarily closed to reverse operation of cylinder means 176 causing retraction of piston 177. Retraction of the piston 177 closes switch means 216 and thus energizes magnets 213 and 213' for another cycle when both carrier means 22, 22' have again been unloaded in the transfer zone 25.

It will thus be apparent that each time carrier means 22 is loaded, positioned in the transfer zone, and tile unloaded onto a tile setter means 24, a circuit is partially completed for energization of the setter conveyor control means. After unloading carrier means 22 is lowered to start another loading cycle. During the time period for unloading and lowering of carrier means 22, the tile on the composite conveyor 21 have been directed to the carrier means 22' for loading thereof. When the carrier means 22' is unloaded in the transfer zone onto tile setter means 24, such unloading operation of carrier means 22' completes the partially completed circuit to the tile setter conveyor control means so that when the tile are fully unloaded from carrier means 22', the setter conveyor 23 is immediately actuated to remove the loaded setters from transfer zone 25. This movement is completed before the carrier means 22 is again fully loaded and in elevated position ready for transferring tile to the newly positioned empty tile setter means 24. Thus it will be apparent that a continuous stream of rapidly moving tile emerging from a spray zone are automatically mechanically handled and placed in vertically stacked spaced relation in tile setters which may be conveyed in any desirable manner to a kiln for burning of the tile.

A specific example of rapid handling of tile by the apparatus emphasizes the particular arrangement of the pair of carrier means 22, 22', jig member 72 and its actuating means comprising the cylinder and piston means 80, 79, the transfer means and the tile setter conveyor. Sprayed tile advancing in abutting end-to-end relation at the rate of 120 tile per minute, move onto the composite conveyor means where they may be divided into two groups of 18 tile, the groups being arranged in echelon with the lead group advancing toward carrier means 20 for reception thereby, each tile on an individual tile support element. At the rate at which the tile advance, 18 tile will be loaded on the carrier means in about 9 seconds. As the last tile of the first group is loaded, it will be noted that the first tile of a second group is approaching into proximity with carrier means 22'. The tile on carrier means 22 are elevated into the transfer zone by relative movement of the jig member with respect to the rack bar, are transferred by the push means onto the tile setter carried by the tile setter conveyor, and then the jig member and rack bar are lowered so as to be in proper position for receiving the third group of 18 tile or the second group which approaches carrier means 22. It will thus be apparent that carrier means 22 must raise and discharge tile carried thereby and then be returned to loading position in 9 seconds in order to receive the next group of tile advancing toward carrier means 22. It will thus be noted that the rapid elevation of the carrier means to the transfer zone is important so that the continuous advancement of tile at the rate of 120 tile per minute may be maintained. It should also be noted that when the jig member is lifted to the unloading or transfer station that the Geneva wheel which determines the intermittent elevation of the rack bar has not turned because no tile has intercepted the photoelectric eye beam which produces the actuating signal for intermittent raising of the rack bar. Thus, the raising, unloading and lowering of the carrier means 22 is accomplished in a rapid positive manner and is temporarily disassociated with respect to operation from the intermittent actuating mechanism of the Geneva wheel.

In the embodiment of the invention described above, the carrier means 22 is lowered by gravitational forces and such lowering is cushioned by slipping of clutch means 108. If desired, rack bar 66 (Fig. 22) may have connected to the top thereof a vertically disposed depending piston rod 225 of a dash pot cylinder means 226 carried above the top frame structure of the apparatus, said piston rod 225 having a piston head 227 operable within the cylinder and ported at 228 to provide a restriction of selected flow area to limit rate of lowering of the rack bar 66 and jig member 72. By selecting an orifice of desired size in piston head 227, it will be apparent that lowering of the rack bar 66 and jig member 72 may be controlled to a desired rate.

The embodiment of this invention also contemplates means for disconnecting the apparatus in the event of power failure or on shut off of the apparatus so that the article support carrier means will not fall from elevated position. In Figs. 4 and 16, the innermost end of shaft 105 may be provided with a ratchet 230. A pawl 231 may be pivoted at 232 to engage both ratchets 230 to prevent rotation in one direction. One end of the pawl may be connected to an armature 233 of a solenoid 234 which may be connected to a control panel 235 for the electrical system of the apparatus. In the event of power failure, the solenoid 234 is de-energized causing armature 233 to be biased upwardly and causing the pawl 231 to engage both ratchets 230 and lock shafts 105, 105' against counterclockwise rotation as viewed in Fig. 16.

It will be readily understood by those skilled in the art that a novel apparatus and method of automatically mechanically handling flat polygonal articles or tile is provided by the apparatus described above. Apparatus 20 is adapted to handle a continuous stream of rapidly advancing tile in such a manner that a glaze composition deposited thereon is undisturbed. Unburned tile are supported by the various components of apparatus 20 in such a manner that breakage of the tile is prevented. While the exemplary apparatus 20 shows two carrier means 22, 22' for alternately handling successively advancing groups of tile, it will be understood that more than two carrier means may be provided to receive more than two groups of tile if it is desired to increase the speed at which advancing tile are introduced to the composite infeed conveyor means 21.

It is of particular importance to note that apparatus 20 is actuated in response to advancing tile. In other words, tile fed into the apparatus is first counted and divided into columns or groups of a selected number of tile, each tile of each group causing actuation of the carrier means for elevation of tile in vertical spaced apart relation into a transfer zone. It will also be apparent to those skilled in the art that the sequence of steps in the operation of the various components of apparatus 20 is positive, simply effected, and performed with the result that apparatus 20 may be utilized in a production line.

Those skilled in the art will readily understand that various modifications and changes may be made in the apparatus described above and which come within the spirit of this invention, and all such changes and modifications coming within the scope of the appended claims are embraced thereby.

I claim:
1. In an apparatus for arranging and supporting flat polygonal articles in vertical spaced relation, the combination of: a feed conveyor means including a pair of spaced conveyor endless elements to advance a plurality of articles in spaced relation in column in a horizontal plane; vertically disposed carrier means including a rack bar and a relatively vertically movable jig member provided with a plurality of vertically spaced article support elements to pass between said conveyor elements at the end of the feed conveyor means and to receive and carry an article; means responsive to each article advanced on said conveyor means to intermittently elevate both the rack bar and jig member a selected vertical distance to receive each article; means including a fluid operable means connected to the rack bar and to the jig member for raising the jig member relative to the rack bar into a transfer zone; support means at the transfer zone to receive and support said articles in vertical spaced relation; and pusher means including a pair of pusher members having inclined faces in vertical spaced relation corresponding to the spacing of said article support elements and adapted to laterally push articles carried thereon to simultaneously transfer said articles to said support means.

2. In an apparatus for rapidly handling and arranging continuously fed tile into vertical spaced relation in a tile setter means, the combination of: a composite feed conveyor means including a pair of spaced feed conveyor sections to advance in parallel pathways separate groups of tile in column and in echelon; a pair of carrier means at the ends of said pair of conveyor sections, each carrier means including an intermittently movable rack bar and a jig member movable relative thereto and provided with a plurality of vertically spaced tile support elements; means responsive to each tile advancing on said conveyor section to intermittently elevate both the rack bar and jig member a selected vertical distance for individual reception of each tile; a fluid operable means connected to each rack bar and to its associated jig member for raising the jig member relative to the rack bar into a tile transfer zone; tile setter means positioned above the conveyor sections at said transfer zone; and pusher means to laterally push tile carried by each carrier means onto said tile setter means, said pusher means being alternately operable to transfer tile from one carrier means and then from the other carrier means.

3. An apparatus as stated in claim 2 wherein said pusher means includes a pair of inclined faces to engage the bottom edge of each tile and wherein said tile support elements are positioned by said jig member at the transfer zone in a plane spaced slightly above the corresponding plane for such tile when positioned in said tile setter means.

4. In an apparatus for rapidly arranging and supporting tile or the like in vertical spaced relation, the combination of: a feed conveyor means including spaced conveyor sections to advance a plurality of tile in spaced relation and in column; vertically disposed carrier means at the end of one of said conveyor sections including a rack bar and a jig member movable relative to said bar and provided with a plurality of vertically spaced tile support elements each to receive and carry a tile; means responsive to each tile advancing on said one conveyor section to intermittently, simultaneously elevate both rack bar and jig member a selected vertical distance to receive each tile; means operably connected with the rack bar and the jig member for raising the jig member relative to the rack bar into a tile transfer zone when said jig member receives a selected number of tile; support means at the transfer zone to receive and support said tile in vertical spaced relation; and pusher means to laterally push tile carried by said jig member onto said tile support means.

5. In an apparatus for rapidly arranging and supporting tile or the like in vertical spaced relation the combination of: a feed conveyor means including spaced conveyor endless elements to advance a plurality of tile in spaced relation in column; vertically disposed carrier means at the end of said conveyor endless elements including a rack bar and a relatively movable jig member provided with a plurality of vertically spaced article support elements each to receive from said endless elements a tile and to support such tile; means responsive to each tile advancing on said conveyor means to intermittently, simultaneously elevate both rack bar and jig member a selected vertical distance to receive each tile; means including a fluid operable means connected with the rack bar and jig member for raising the jig member relative to the rack bar into a tile transfer zone; support means at the transfer zone to receive and support said tile in vertical spaced relation; and pusher means opposite the support means to laterally push tile carried by said jig member onto said tile support means.

References Cited in the file of this patent

UNITED STATES PATENTS

| Number | Name | Date |
|---|---|---|
| 1,026,046 | Penfield | May 14, 1912 |
| 1,288,962 | Moore | Dec. 24, 1918 |
| 1,418,658 | Ladd | June 6, 1922 |
| 1,606,477 | McClelland | Nov. 9, 1926 |
| 1,779,210 | Davis | Oct. 21, 1930 |
| 1,972,489 | Rideout et al. | Sept. 4, 1934 |
| 2,264,818 | Wilcox et al. | Dec. 2, 1941 |
| 2,328,388 | Morgan et al. | Aug. 31, 1943 |
| 2,404,232 | Hunter | July 16, 1946 |
| 2,529,777 | McInnis | Nov. 14, 1950 |
| 2,699,264 | Bruce et al. | Jan. 11, 1955 |
| 2,710,696 | Fontaine et al. | June 14, 1955 |
| 2,781,136 | Sehn et al. | Feb. 12, 1957 |
| 2,827,179 | Maple | Mar. 18, 1958 |